2,715,407

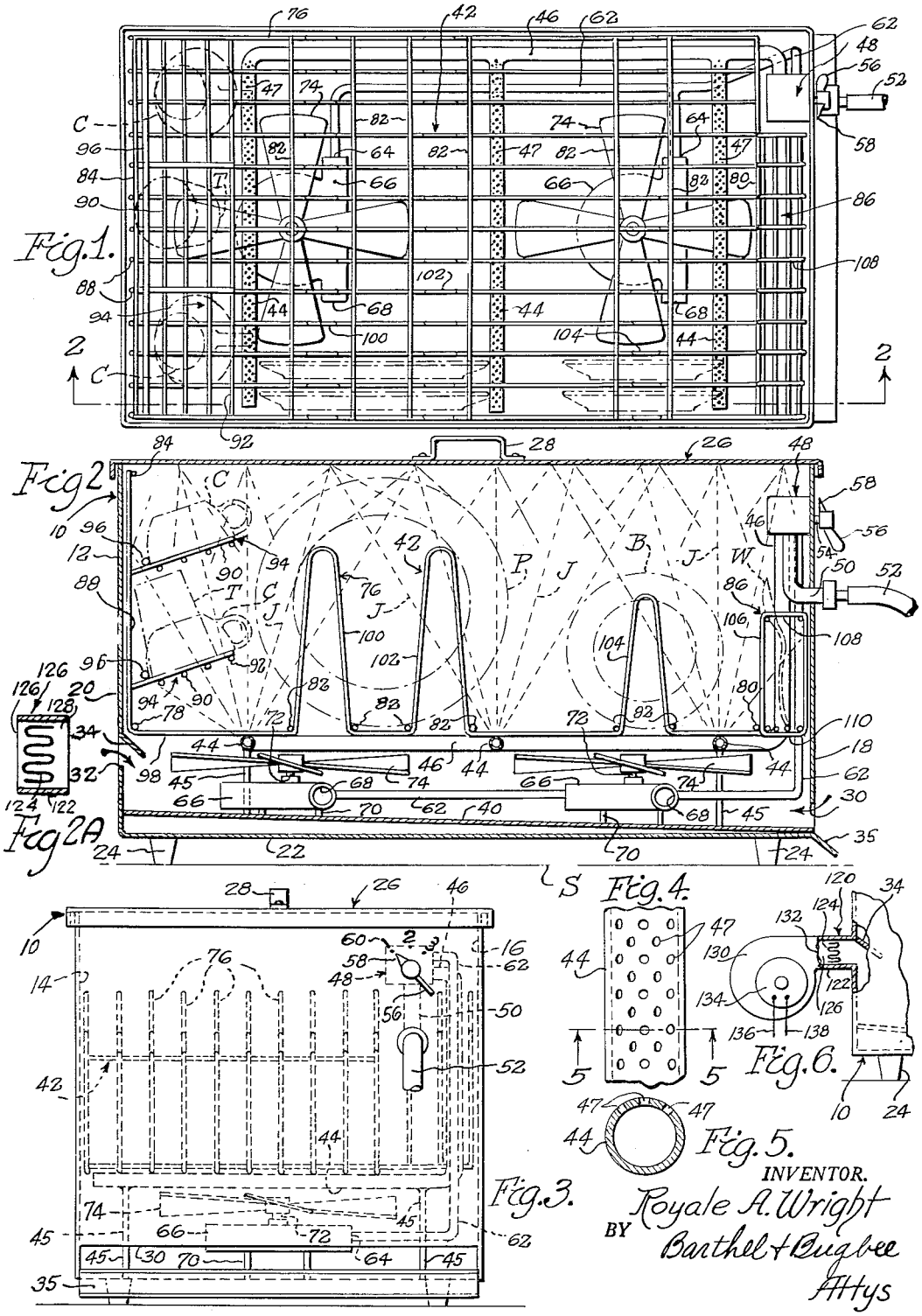

DISH RINSING AND DRYING APPLIANCE

Royale A. Wright, Detroit, Mich.

Application April 12, 1954, Serial No. 422,291

10 Claims. (Cl. 134—99)

This invention relates to domestic appliances and, in particular, to dish rinsing and drying equipment.

One object of this invention is to provide a dish rinsing and drying appliance in which the dishes are placed after they have been washed and which first sprays the dishes with hot water and afterward dries them by means of blasts of air forced against the dishes from fans rotated by water motors connected to the household water system.

Another object is to provide a dish rinsing and drying appliance which accommodates a greater number of dishes than the ordinary dish rinsing rack and rinses both sides of the dishes thoroughly, as well as rinsing cups, tumblers, silverware and other articles used in the kitchen and dining-room.

Another object is to provide a dish rinsing and drying appliance of the foregoing character wherein rinsing is accomplished by perforated spray tubes which throw jets of water upward against the dishes, this water rebounding onto the dishes from the inner wall of the cover and flowing downward and outward along an inclined bottom into the sink.

Another object is to provide a dish rinsing and drying appliance which is sufficiently small and portable to be placed either in the sink or upon the drainboard at the side of the sink, so that the appliance may be used either in the sink or at the side of the sink as circumstances require or permit.

Other objects and advantages of the invention will become apparent during the course of the following description of the accompanying drawing, wherein:

Figure 1 is a top plan view of a dish rinsing and drying appliance, with the cover removed, according to one form of the invention;

Figure 2 is a vertical section taken along the line 2—2 in Figure 1;

Figure 2A is a vertical section through an air heater adapted to be optionally attached to the appliance shown in Figures 1 and 2;

Figure 3 is a right-hand end elevation of the appliance shown in Figures 1 and 2;

Figure 4 is an enlarged fragmentary top plan view of a portion of the spray tube by which hot water is sprayed upward onto the dishes;

Figure 5 is a cross-section taken along the line 5—5 in Figure 4; and

Figure 6 is a fragmentary view, on a reduced scale, of the lower left-hand corner of Figure 2, modified to provide a forced draft heating arrangement for the incoming air.

Referring to the drawings in detail, Figures 1, 2 and 3 show a dish rinsing and drying appliance, generally designated 10, according to one form of the invention as adapted to rest on a surface S which is either the bottom of a kitchen sink or the drainboard thereof. The appliance 10 is housed in a casing or container 12 having front and back walls 14 and 16 respectively, opposite end walls 18 and 20 and a bottom wall 22, the latter having legs 24 which rest upon the surface S and space the bottom wall 22 above the surface S. A flanged detachable cover 26 rests upon the upper edge of the casing 12 and prevents leakage of water during operation. A handle 28 riveted or otherwise secured to the cover 26 rests upon the upper edge of the casing 12 and prevents leakage of water during operation. A handle 28 riveted or otherwise secured to the cover 26 enables the latter to be conveniently lifted off of the casing 12 or replaced thereon.

In order to provide for the admission of air for drying the dishes after they have been rinsed, the end walls 18 and 20 are provided with elongated slots 30 and 32 respectively, the slot 30 being near the bottom wall 22 and the slot 32 spaced a short distance above it. The slot 32 is provided with an inwardly-bent deflector 34 integral with the end wall 20 and serving to deflect the incoming air downward into the bottom portion or fan chamber 36 of the casing 12 and below the dish chamber 38 thereof. As will subsequently be explained, the slot 30 also serves as a drain port for the water flowing out of the casing 12.

An inclined false drain bottom or catch basin 40 is mounted within the casing 12 above the bottom 22 thereof and slopes downward toward the lower slot or port 30, so that water will flow downward by gravity along the drain bottom 40 and out through the port 30 when rinsing is in progress, as described below in connection with the operation.

The dishes, silverware and other utensils to be rinsed and dried are held in a coated wire rack, generally designated 42, roughly resembling a cage and resting upon perforated branch spray pipes 44 supported on legs 45 resting upon the drain bottom 40 and extending horizontally across the top of the fan chamber 36. The spray pipes 44 are connected to a hot water pipe 46 and are provided with multiple holes 47 which serve as water nozzles. The hot water pipe 46 leads upward at one end to a water control valve 48. The water control valve 48 is supplied with water through a water inlet pipe 50 to which is connected a flexible hose 52 leading to the combined hot and cold water faucet nozzle (not shown) of the ordinary kitchen sink. Thus, depending upon the setting of the faucet valve, hot water, cold water or a mixture thereof flows through the hose 52 and thence through the pipe 50 into the valve 48. The valve 48 is a three-position valve controlled by a rotary valve stem 54 to which is connected a handle 56, the pointer 58 of which registers with a position-indicating scale 60 marked in three positions.

Leading downward from the valve 48 is a cold water supply pipe 62 connected to the inlets 64 (Figures 1 and 3) of two rotary water motors 66, the outlets 68 of which discharge laterally (Figure 2). The water motors 66 have feet 70 by which they are supported upon the drain bottom 40. Each of the water motors 66 contains a rotor (not shown) on a rotary shaft 72 upon the outer end of which is mounted a fan 74. As a consequence, when water under pressure is applied to the pipe 62, it operates the water motors 66 to rotate the shafts 72 and fans 74 so as to throw blasts of air upward and draw in air through the elongated slots or ports 30 and 32, as explained below in connection with the operation of the invention.

The rack 42 is composed of multiple longitudinal bent wire spacer members 76 disposed in laterally-spaced vertical planes and interconnected at their opposite lower ends by end cross members 78 and 80, at intermediate locations by intermediate cross members 82, and at their tops at one end by an upper cross member 84. A silverware rack 86 is connected at the opposite end adjacent the end cross member 80. Each of the spacer members 76 is provided at the end 88 adjacent the cross members 78 and 84 with vertically-spaced upwardly-inclined shelf bracket rods 90, the lower ends of which are welded or otherwise secured to the vertical end members 88 and are laterally interconnected by shelf cross members 92 welded beneath the bracket rods 90 to form cup or tumbler shelves 94 having stop rods 96 welded across their upper sides near the points of connection of the bracket rods 90 with the vertical end portions.

Besides the vertically-bent end portion 88, each spacer member 76 is provided with a bottom portion 98 having spaced vertically directed plate-holding open loops 100, 102 and 104 (Figure 2), the bases of which are strengthened by the intermediate cross members 82 connected thereto. The silverware rack 86 consists of closed rectangular loops 106 spaced laterally apart from one another by approximately the same spacing as the spacer members 76, and similarly interconnected by upper and lower cross members 108 and 110 respectively.

In the operation of the invention, let it be assumed that the rinsing and drying appliance 10 is placed on the surface S of the sink or its drainboard, according to convenience, and that the hose 52 is connected to the common nozzle of a kitchen sink hot and cold water faucet set, the handles of which determine whether cold water, hot water or a mixture thereof will flow outward through the nozzle and thence through the hose 52 and pipe 50 to the water control valve 48. Let it be assumed that the control valve handle is set at its position 1 (Figure 3) which is the "off" position.

The housewife washes the cups C, tumblers T, plates P, butterplates B and silverware W in the usual manner in the dish pan or in the sink and places them in the appropriate positions in the rack 42 (Figure 2). The cups C and tumblers T are placed on the shelves 94, the large plates P are placed between the pairs of open loops 100 and 102, the butterplates or salad plates B between the lower open loops 104, and the silverware W in the silverware rack 86 between the rectangular closed loops 106. The housewife then replaces the cover 26 and turns on the hot water faucet at the sink. She then turns the valve handle 56 to the second or hot water position on the scale 60, whereupon hot water flows through the hose 52, pipe 50, control valve 48, hot water pipe 46 and spray pipes 44, the pressure of the water causing jets of hot water to spurt upward as shown by the dotted line in Figure 2, rebounding from the inner wall of the cover 26. The jets of water J in spurting upward impinge upon the cups C, tumblers T and plates P and B, rinsing off any soap which may be adhering to them and at the same time heating them to a temperature much higher than room temperature. The water after rinsing the dishes and silverware falls downward onto the inclined drain bottom 40 and flows downward and outward through the lower slot or port 30 and down the ramp 35 onto the sink or drainboard surface S and thence down the drain.

After the hot water rinsing operation has proceeded for a sufficient length of time, depending upon the number of dishes to be rinsed and the desire of the user, the housewife shuts off the hot water faucet at the sink, removes the cover 26, shifts the valve handle 56 to the third or cold water position of the scale 60 and turns on the cold water faucet at the sink. Cold water under pressure then passes through the hose 52, pipe 50, control valve 48, and pipe 62 to the inlets 64 of the rotary water motors 66, causing their rotors, shafts 72 and fans 74 to rotate rapidly, the expended water flowing from the pump discharge ports 68 down the inclined drain bottom 40 and out through the lower port 30 into the sink.

The rotation of the fans 74 by the water motors 66 creates a suction in the fan chamber 36 by blowing the air therefrom upward between the plates P and B and around the cups C, tumblers T and silverware W, drawing in fresh air through the ports 30 and 32, as indicated by the arrows in Figure 2. The blasts of air thus directed upward by the fans 74 complete the drying of the dishes in a rapid and efficient manner.

The term "dish" used in the accompanying claims will be understood to include plates, cups, saucers, tumblers, cutlery and other articles commonly requiring washing and drying in the ordinary kitchen.

In order to heat the incoming air to further assist the drying action, Figure 2A shows a heating device 120 is optionally attached to the casing side wall 20 adjacent the air inlet slot or port 32 of the casing 12 shown in Figure 2. This heating unit 120 consists of a heater casing 122 containing an electrical heating element 124 connected to the ordinary house lighting circuit. Air enters through the inlet opening 126, passes over the heating element 124 and through the passageway 128 within the heater casing 122 and is drawn through the air inlet port 32 in the direction of the arrow (Figure 2) by the suction created by the fans 74 driven by the water motors 66. The deflector 34 prevents water from splashing onto the heating element 124.

To further enhance the flow of heated air into the casing 12, Figure 6 further shows a rotary blower 130 having its outlet 132 connected to the inlet 126 of the heater casing 122 and driven by an electric motor 134 energized by the conductors 136 and 138. The latter are connected to an ordinary house lighting circuit in the usual way, and also supply current to the heating element 124.

It will be evident from Figure 2 that the motors 66 and fans 74 may be mounted in the cover 26 in order to blow the air downward on the dishes, instead of upward, as shown in Figures 1 to 4 inclusive, in which case the valve 48 would either be left where it is in Figure 2 with a flexible pipe connection leading to the motors 66, or mounted on the cover 26 with the motors.

What I claim is:

1. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor having a rotary fan operatively connected thereto, a hot water supply pipe leading to said spray device, a cold water supply pipe leading to said water motor, and means for selectively supplying hot and cold water to said pipes.

2. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor having a rotary fan operatively connected thereto, a hot water supply pipe leading to said spray device, a cold water supply pipe leading to said water motor, and means for selectively supplying hot and cold water to said pipes, said spray device comprising a perforated pipe extending to different portions of said casing adjacent said rack.

3. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor having a rotary fan operatively connected thereto, a hot water supply pipe leading to said spray device, a cold water supply pipe leading to said water motor, and means for selectively supplying hot and cold water to said pipes, said spray device comprising a perforated pipe extending to different portions of said casing adjacent said rack, said rack resting on and being supported by said pipe.

4. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor having a rotary fan operatively connected thereto, a hot water supply pipe leading to said spray device, a cold water supply pipe leading to said water motor, and means for selectively supplying hot and cold water to said pipes, said spray device comprising a perforated pipe extending to different portions of said casing adjacent said rack, said pipe having branches extending beneath said rack in supporting engagement therewith.

5. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor having a rotary fan operatively connected thereto, a hot water supply pipe leading to said spray device, a cold water supply pipe leading to said water motor, and means for selectively supplying hot and cold water to said pipes, said spray device comprising a perforated pipe extending to different portions of said casing adjacent said rack and between said rack and said fan.

6. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor mounted in the lower portion of said casing and having a rotary fan disposed thereabove and operatively connected thereto, a hot water supply pipe leading to said spray device, a cold water supply pipe leading to said water motor, and means for selectively supplying hot and cold water to said pipes.

7. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor mounted in the lower portion of said casing and having a rotary fan disposed thereabove and operatively connected thereto, a hot water supply pipe leading to said spray device, a cold water supply pipe leading to said water motor, and means for selectively supplying hot and cold water to said pipes, said spray device comprising a perforated pipe extending to different portions of said casing between said rack and said fan.

8. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor mounted in the lower portion of said casing and having a rotary fan disposed thereabove and operatively connected thereto, a hot water supply pipe leading to said spray device, a cold water supply pipe leading to said water motor, and means for selectively supplying hot and cold water to said pipes, said spray device comprising a perforated pipe extending to different portions of said casing between said rack and said fan, said rack resting on and being supported by said pipe.

9. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor mounted in the lower portion of said casing and having a rotary fan disposed thereabove and operatively connected thereto, a hot water supply pipe leading to said spray device, a cold water supply pipe leading to said water motor, and means for selectively supplying hot and cold water to said pipes, said spray device comprising a perforated pipe extending to different portions of said casing between said rack and said fan, said pipe having branches extending beneath said rack in supporting engagement therewith.

10. A dish rinsing and drying appliance for connection to a conventional outlet means for supplying hot and cold water under pressure, said appliance comprising a casing having a dish rack therein adapted to hold the dishes in substantially vertical positions in laterally-spaced relationship, a hot water spray device disposed adjacent said rack with spray orifices directed toward said rack, a rotary water motor having a rotary fan operatively connected thereto, a water control valve, a hot water supply pipe leading from said valve to said spray device, a cold water supply pipe leading from said valve to said water motor, and means for connecting said valve to a supply of hot and cold water.

References Cited in the file of this patent

UNITED STATES PATENTS 1,261,778    Deming _____ Apr. 9, 1918